(12) United States Patent
Aoki (10) Patent No.: US 9,317,226 B2
(45) Date of Patent: Apr. 19, 2016

(54) IMAGE PROCESSING APPARATUS FOR ALLOWING A USER TO SELECT A REGION OF A WEB PAGE

(75) Inventor: Nobushige Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/375,747

(22) PCT Filed: Jun. 4, 2010

(86) PCT No.: PCT/JP2010/003756
§ 371 (c)(1),
(2), (4) Date: Dec. 1, 2011

(87) PCT Pub. No.: WO2010/143392
PCT Pub. Date: Dec. 16, 2010

(65) Prior Publication Data
US 2012/0099153 A1    Apr. 26, 2012

(30) Foreign Application Priority Data
Jun. 9, 2009    (JP) .................................. 2009-138399

(51) Int. Cl.
*G06F 17/21* (2006.01)
*G06F 3/12* (2006.01)

(52) U.S. Cl.
CPC ............ *G06F 3/1204* (2013.01); *G06F 3/1245* (2013.01); *G06F 3/1246* (2013.01); *G06F 3/1287* (2013.01)

(58) Field of Classification Search
None
See application file for complete search history.

(56) References Cited

U.S. PATENT DOCUMENTS

| 5,745,659 | A  | * | 4/1998 | Rigau Rigau et al. ......... 358/1.2 |
| 6,185,588 | B1 | * | 2/2001 | Olson-Williams G06F 17/30896 707/E17.118 |
| 7,519,573 | B2 | * | 4/2009 | Helfman et al. |
| 7,685,514 | B1 | * | 3/2010 | Khatwani ............. G06F 17/211 715/243 |
| 8,365,082 | B2 | * | 1/2013 | Skirpa ................... G06F 3/0481 715/760 |
| 8,527,905 | B2 | * | 9/2013 | Chen ................. G06F 17/30902 709/217 |
| 8,910,060 | B2 | * | 12/2014 | Chandra ........... G06F 17/30884 709/204 |

(Continued)

FOREIGN PATENT DOCUMENTS

| CN | 101169707 A | 4/2008 |
| CN | 101365030 A | 2/2009 |

(Continued)

OTHER PUBLICATIONS

Microsoft Office Visio 2003, Mark. H. Walker and Nanette Eaton, Microsoft Press, 2003.*

(Continued)

*Primary Examiner* — Paul F Payer
(74) *Attorney, Agent, or Firm* — Canon U.S.A., Inc. IP Division (57) ABSTRACT

An image processing apparatus includes a determination unit configured to determine coordinate of a region in a web page having a plurality of elements in a structured document, the display region being specified by a user, an extraction unit configured to extract image data corresponding to the coordinate determined by the determination unit in the web page, an output unit configured to output an image based on the image data extracted by the extraction unit, wherein, when the region specified by the user is a part clipped out of an element in the web page, the extraction unit extracts image data of the part of the element corresponding to the coordinate determined by the determination unit.

13 Claims, 11 Drawing Sheets

(56) References Cited

U.S. PATENT DOCUMENTS

| | | | |
|---|---|---|---|
| 2002/0025085 A1* | 2/2002 | Gustafson et al. | 382/311 |
| 2002/0080179 A1* | 6/2002 | Okabe et al. | 345/769 |
| 2003/0123079 A1* | 7/2003 | Yamaguchi et al. | 358/1.15 |
| 2004/0066531 A1* | 4/2004 | Kim | 358/1.15 |
| 2006/0290976 A1 | 12/2006 | Ko | |
| 2007/0201761 A1* | 8/2007 | Lueck | 382/276 |
| 2007/0233661 A1* | 10/2007 | Sayuda | 707/3 |
| 2008/0313722 A1* | 12/2008 | Cho et al. | 726/7 |
| 2010/0281351 A1* | 11/2010 | Mohammed | G06F 3/1204 715/205 |
| 2014/0053053 A1* | 2/2014 | Hogue | G06F 17/2247 715/234 |

FOREIGN PATENT DOCUMENTS

| | | | |
|---|---|---|---|
| JP | 50-46777 | A | 2/1993 |
| JP | 3588337 | A | 2/2002 |
| JP | 2007-018261 | A | 1/2007 |
| JP | 2008-226202 | A | 9/2008 |
| KR | 10-0526109 | B1 | 10/2005 |
| WO | 2007/111330 | A1 | 10/2007 |
| WO | 2008/092079 | A2 | 7/2008 |
| WO | WO 2008092079 A2 * | 7/2008 | ............ G06F 21/00 |

OTHER PUBLICATIONS

Using Adobe Fireworks CS4 for Windows and Mac OS, published 2008.*
Shouhei Asami et al.,Proceedings of the 69th Annual Convention IPS Japan,Mar. 6, 2007,pp. 2-507 to 2-508.
CorelDRAW Graphics Suite X3,Web Designing,Sep. 1, 2006, p. 148.
PC Japan,Sep. 1, 2003, vol. 8,No. 9, p. 25.
Shohei Asami et al., "Web clipping system, 69th National Convention", 2007 p. 2-507, p. 2-508.
Kamicopi, "Windows100% vol. 10 No. 11"; Nov. 1, 2007.
Anonymous: "About Vector Images—Two Types of Graphics—Vector and Bitmap" Nov. 3, 2006, XP055132578, Retrieved from the Internet: URL:https://web.archive.org/web/20061103040300/http://graphicssoft.about.com/od/aboutgraphics/a/bitmapvector_2.htm [retrieved on Jul. 31, 2014].

\* cited by examiner

```
<?xml version="1.0" encoding=" shift_jis"?>
<!DOCTYPE html PUBLIC "XXXXX">
<html xmlns="http://www.w3.org/1999/xhtml" xml:lang="ja" lang="ja">
<head>
<meta http-equiv=" Content-Type" content=" text/html: charset=shift_jis" />
<title>PRODUCT INFORMATION</title>
<script type=" text/javascript" src=" /js/cngimgjs" ></script>
</head>
<body>
<span id=clip_rect style=" position:absolute; left:100px; top:100px; width:200px; height: 200px; z-index: 1000">
</span>

...

</dody>
<html>
```

IMAGE PROCESSING APPARATUS FOR ALLOWING A USER TO SELECT A REGION OF A WEB PAGE

TECHNICAL FIELD

The present invention relates to an image processing apparatus that outputs an image based on a structured document.

BACKGROUND ART

Nowadays, people can obtain various pieces of information when accessing web pages on the Internet. Each of the web pages is a structured document written in a structured language such as Hyper Text Markup Language (HTML) or Extensible Hyper Text Markup Language (XHTML). The web page is displayed for viewing on a display in software called a browser for the structured document. Japanese Patent No. 03588337 discusses a method for selecting and printing a region of a web page as an image. When the method is used, usually, a web page is displayed in a browser on a display, and a region in the displayed web page is selected by a user using a pointing device such as a mouse.

Conventionally, however, when a region of a web page displayed in a browser is selected in the browser, the selection is made only on an element-by-element basis in the structured document. In other words, a user cannot select a desired region such as a part of an image element or a part of a text element.

SUMMARY OF INVENTION

The present invention is directed to an image processing apparatus that allows a user to select a region of a web page as desired.

According to an aspect of the present invention, an image processing apparatus includes a determination unit configured to determine coordinate of a region in a web page having a plurality of elements in a structured document, the display region being specified by a user, an extraction unit configured to extract image data corresponding to the coordinate determined by the determination unit in the web page, an output unit configured to output an image based on the image data extracted by the extraction unit, wherein, when the region specified by the user is a part clipped out of an element in the web page, the extraction unit extracts image data of the part of the element corresponding to the coordinate determined by the determination unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
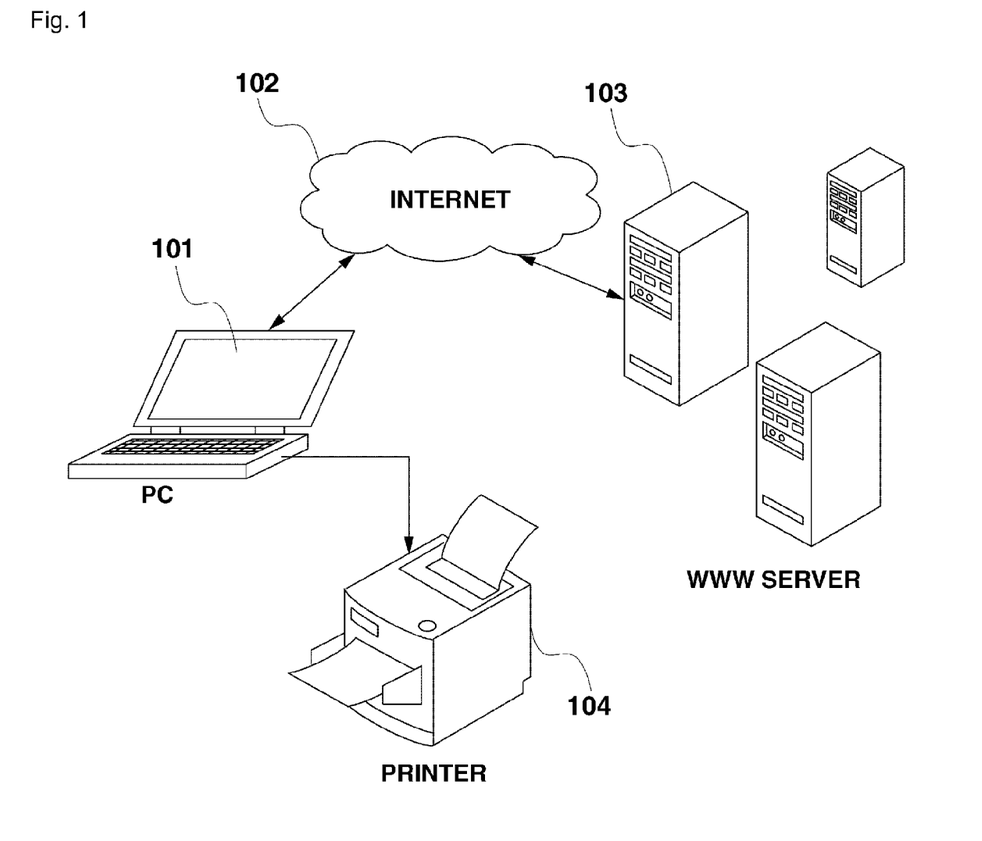
FIG. 1 illustrates a printing system for printing based on a structured document.

FIG. 1 illustrates a printing system for printing based on a structured document. A personal computer (PC) 101 in FIG. 1 is connected to a printer 104, and serves as a printing control apparatus that controls image printing by the printer 104. The PC 101 is also connected to a World Wide Web (WWW) server 103 via the Internet 102 for download of structured documents from the WWW server 103, each document being written in a structured language. The PC 101 displays a web page based on an obtained structured document. The structured document is written in a language such as HTML and XHTML. The PC 101 drives the printer 104 to print images based on the obtained structured document.

Figure 2:
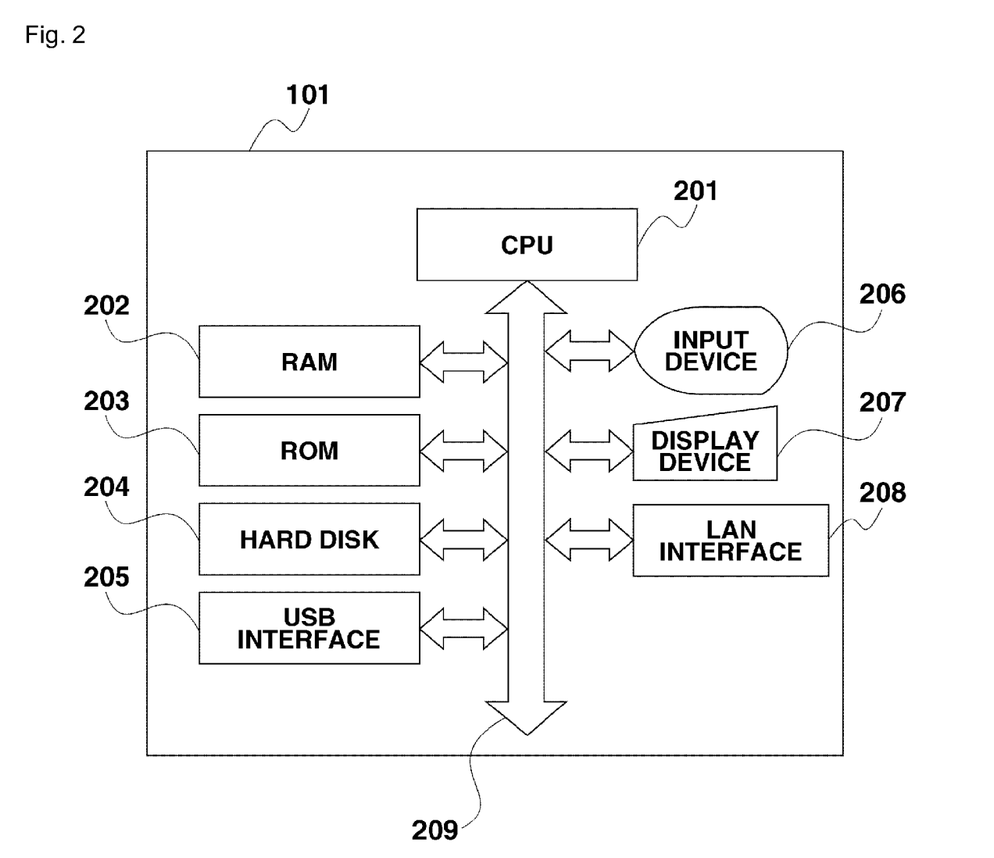
FIG. 2 is a block diagram illustrating a configuration of a personal computer (PC).

FIG. 2 is a block diagram illustrating a configuration of the PC 101. A CPU 201 calculates data and issue commands according to programs, and controls every unit in the PC 101 and devices connected thereto. A RAM 202 is a memory used as a temporary storage area, and a ROM 203 is another memory for storing various programs executed by the CPU 201. A hard disk 204 records an operation system (OS), a browser, and other application software programs and data. Thus, various control operations are performed when the CPU 201 reads a program stored in the ROM 203 or the hard disk 204 and loads the program into the RAM 202, and executes the program with the RAM 202 as a work memory.

A USB interface 205 is configured to be connected to a USB cable for data communication between the PC 101 and the printer 104. The communication may be established through SCSI or radio transmission for example, other than USB cable.

A display device 206 includes a cathode-ray tube (CRT) or a liquid crystal display and a graphic controller for various displays on the PC 101 that serves as an image processing apparatus. For example, web pages downloaded from the WWW server 103, print preview images, and graphic user interfaces (GUIs) are displayed on the display device 206. An input device 207 is used by a user for input of various instructions to the PC 101, and may include a mouse and a keyboard. A system bus 209 is used for transmission of data among the CPU 201, the RAM 202, the ROM 203, and the hard disk 204.

A local area network (LAN) interface 208 is connected to a LAN cable for data communication with the external WWW server 103 via a router (not illustrated) and the Internet 102. The data communication may be wirelessly established using an interface for radio transmission.

In FIG. 2, the PC 101 is a laptop PC having the display device 206 and the input device 207 that are combined with a control unit including the CPU 201 and the RAM 202. The present invention is, however, not limited to this type of PC, and may be applied to a desktop PC having a display device and an input device that are separated from a control unit.

Figure 3:
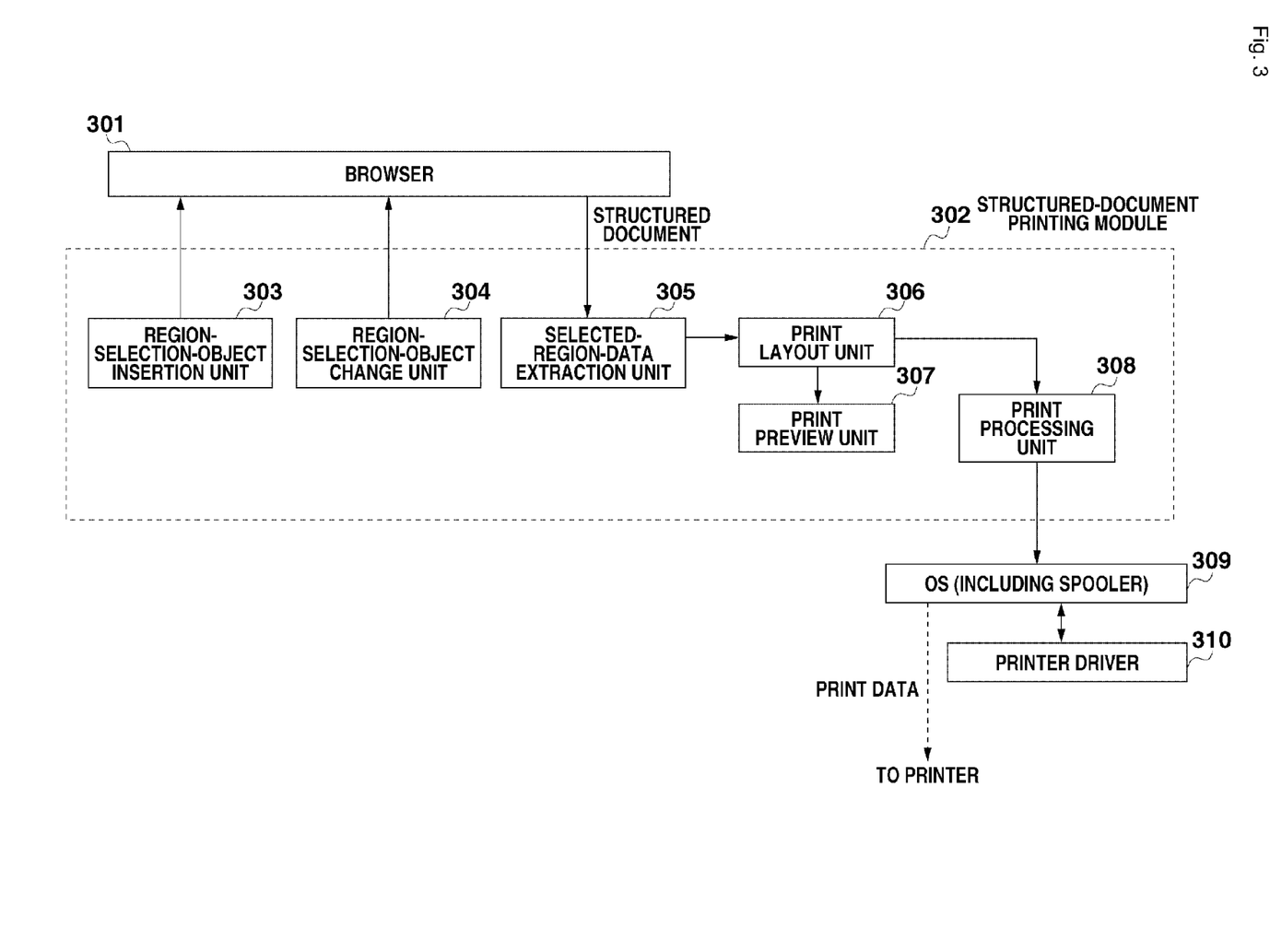
FIG. 3 is a block diagram illustrating a software configuration in a PC.

FIG. 3 is a block diagram illustrating a software configuration in the PC 101. Each block in FIG. 3 illustrates a function type of programs stored in the ROM 203 or the hard disk 204, and is executed by the CPU 201. A program running on the PC 101 and its configuration for data processing will be described with reference to FIG. 3.

In FIG. 3, a browser 301 is an application for displaying web pages, and displays each web page based on a structured document received from the WWW server 103. The browser 301 downloads structured document files such as HTML files onto the hard disk 204 of the PC 101, and displays web pages on the display device 206 based on the files. The web pages are structured document files written in HTML or XHTML, and each structured document is composed of elements for texts and images, the elements being written using tags. Each structured document further includes a file called Cascading Style Sheet (hereinafter, simply referred to as CSS) that specifies a style for displaying each element. The browser 301 analyzes these structured document files, and displays them on the display device 206.

In FIG. 3, the structured-document printing module 302 is plug-in software which is invoked by the browser 301. The structured-document printing module 302 is executed when a user inputs an instruction for region selection to the browser 301. The structured-document printing module 302 executes an extraction of a part of a web page.

In the structured-document printing module 302, a region-selection-object insertion unit 303 inserts at least one region selection object onto the web page displayed on the browser, the region selection object being in the form of a rectangular region for region selection. To raise the region selection object to the forefront of the screen, the region-selection-object insertion unit 303 obtains a Z-order of each element in a structured document, the Z-order indicating a display order of the element. Then, the region-selection-object insertion unit 303 sets the region selection object to have the obtained Z-order that allows the region selection object to be displayed in a structured document in front of the element of the structured document that has been displayed at the forefront of the screen.

A region-selection-object change unit 304 receives an instruction to change a selected region from a user. The instruction is made through the input device 207 such as a mouse by a user. The term "selected region" means a region that is selected from a web page for printing. Upon receipt of the instruction, the region-selection-object change unit 304 changes the coordinates of the selected region, which is specified by the region selection object inserted by the region-selection-object insertion unit 303, in the web page. Accordingly, a user can specify any region as a selected region in a web page, by changing the position and size of the rectangular region in the web page through the input device 207 such as a mouse.

A selected-region-data extraction unit 305 is executed in the case where, after selection of a region in a web page, a user inputs an instruction to the browser for printing or print preview of the region. The selected-region-data extraction unit 305 obtains coordinates of the selected region in the web page that is specified by the region selection object and set by the region-selection-object change unit 304. Then, the selected-region-data extraction unit 305 extracts an element in the structured document that is contained in the selected region represented by the region selection object, and generates an intermediate data file that is used to extract a part of the element. The intermediate data file is image data that is generated by a normal browser based on a structured document for display. The selected-region-data extraction unit 305 generates bit map data using the intermediate data file, to display a web page. The image data that is used to extract a part of the element may be bit map data. In the case of the bit map data, however, when an image is enlarged, the image has a lower resolution. Thus, as the image data that is used to extract a part of the element, text information and graphic information are desirably stored in a vector data format, instead of bit map data. For example, Enhanced Metafile Format (EMF) and Portable Document Format (PDF) can be used in the intermediate data file.

A print layout unit 306 lays out the image data based on the intermediate data file extracted by the selected-region-data extraction unit 305, according to a paper size that is described in print settings. The print settings include information such as paper size, resolution, and printable regions, and are obtained from a printer driver 310 via an operation system (OS) 309.

A print preview unit 307 displays a print preview image on the display device 206, based on the image data laid out by the print layout unit 306.

Upon receipt of an instruction to start printing from a user, a print processing unit 308 executes a image generating process on the printer driver 310 via the OS 309, according to the arrangement information of the elements laid out by the print layout unit 306.

The OS 309 provides an application programming interface (API) for transmitting/receiving print setting data between the structured-document printing module 302 and the printer driver 310, and provides an API for image drawing. The OS 309 includes various types of control software, such as a spooler system that manages print jobs and a port monitor that outputs printer commands to a port, which will not be described below in detail.

The printer driver 310 generates print data according to the image drawing process executed by the print processing unit 308. The printer driver 310 converts the generated print data into a printer command, and transmits the printer command to the printer 104 via the OS 309. Upon receipt of the printer command, the printer 104 prints out the data according to the received printer command.

Figure 4:
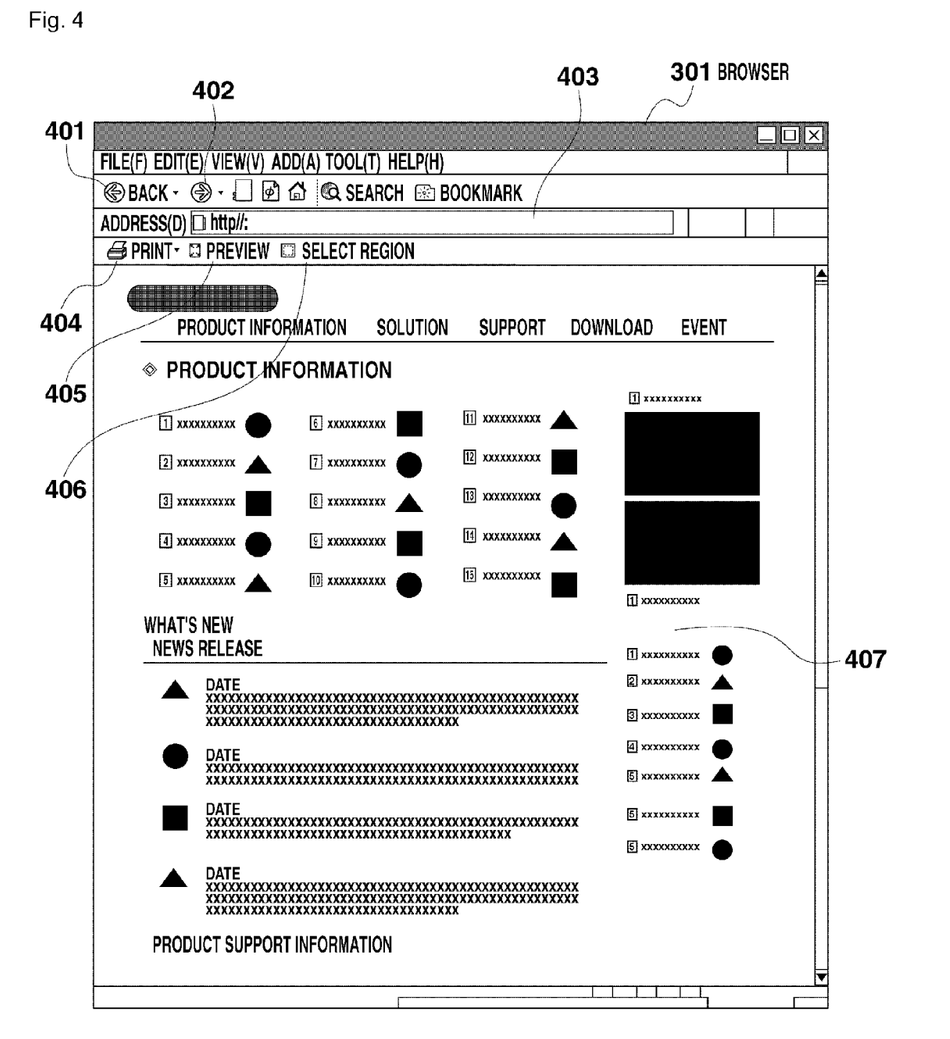
FIG. 4 illustrates a screen of a graphical user interface (GUI).
Figure 5:
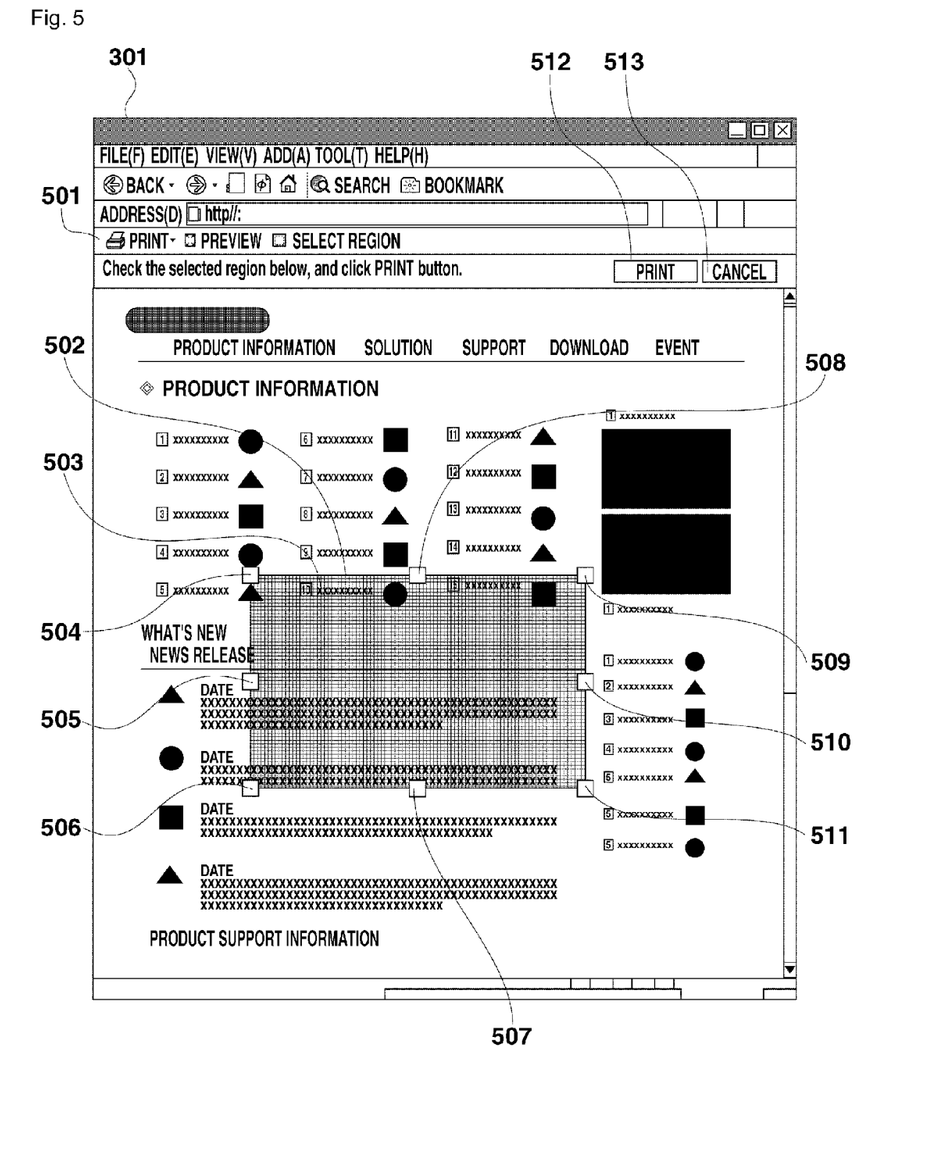
FIG. 5 illustrates a screen of a GUI after a region selection button is clicked.

With reference to FIGS. 4 and 5, an image displayed on the display device 206 by the PC 101 as an apparatus for image processing of a structured document according to the present exemplary embodiment. FIG. 4 illustrates an example of a GUI screen. The browser 301 displays a web page on the GUI. The browser 301 contains a back button 401 and an advance button 402 for switching a web page to be displayed, and an address-input area 403. Furthermore, a print button 404, a print preview button 405, and a region selection button 406 for selection of a region in a web page are arranged in a window. When a user clicks the region selection button 406, the browser 301 invokes the structured-document printing module 302. In the structured-document printing module 302, the region-selection-object insertion unit 303 inserts a region selection object having initial coordinates into a structured document in the browser 301.

FIG. 5 illustrates a GUI screen that is displayed after the region selection button 406 is clicked. Upon the click, a region selection object 502 in FIG. 5 with several elements is inserted by the region-selection-object insertion unit 303. A rectangular object 503 represents a selected region selected by the region selection object 502. The region selection object 502 has initial coordinates that allow the region selection object 502 to reside approximately centrally of a web page displayed by the browser. The region selection object 502 also has an area having an initial size of predetermined values.

The region selection object 502 includes the rectangular object 503 for a selected region, and objects 504 to 511 for changing a rectangular size that are disposed at the four corners and on the four sides of the rectangular object 503. The rectangular object 503 has a semi-transparent image drawing attribute, so that a user can see the selected region in a web page based on a structured document, through the rectangular object rectangular object 503.

A user can change the coordinates of a selected region represented by the region selection object 502 as desired, through an operation onto the rectangular object rectangular object 503 with the input device 207, such as dragging using a mouse.

When a user specifies and drags one of the objects 504 to 511 for changing a rectangular size on the screen as an instruction for a change in the rectangular size, the region-selection-object change unit 304 changes the size of the rectangular object 503 in response to the instruction.

As illustrated in FIG. 5, a print button 512 is also provided for printing a region that is specified by the region selection object 502. Upon a click of the print button 512, the selected-region-data extraction unit 305 obtains the coordinates of the region selection object 502 and the size of the rectangular object 503, and extracts a structured document contained in the rectangular object 503 as an intermediate data file. In FIG. 5, a cancel button 513 for canceling a region selection is also provided. When the cancel button 513 is clicked, the screen returns to the state illustrated in FIG. 4.

In the present exemplary embodiment, a user changes coordinates and a size of the rectangular object 503 by dragging. The operation is not limited to the dragging, and any operation with which a user can specify a position on a screen can be used to change the coordinates and size. When a user specifies a position on a screen, the positional information is input to the PC 101, which is then controlled according to the information.

Even if the region specified by the rectangular object 503 exceeds the region of a web page displayed on the screen by a dragging operation by a user, the rectangular object 503 is controlled to be displayed inside of the web page.

Figure 6:
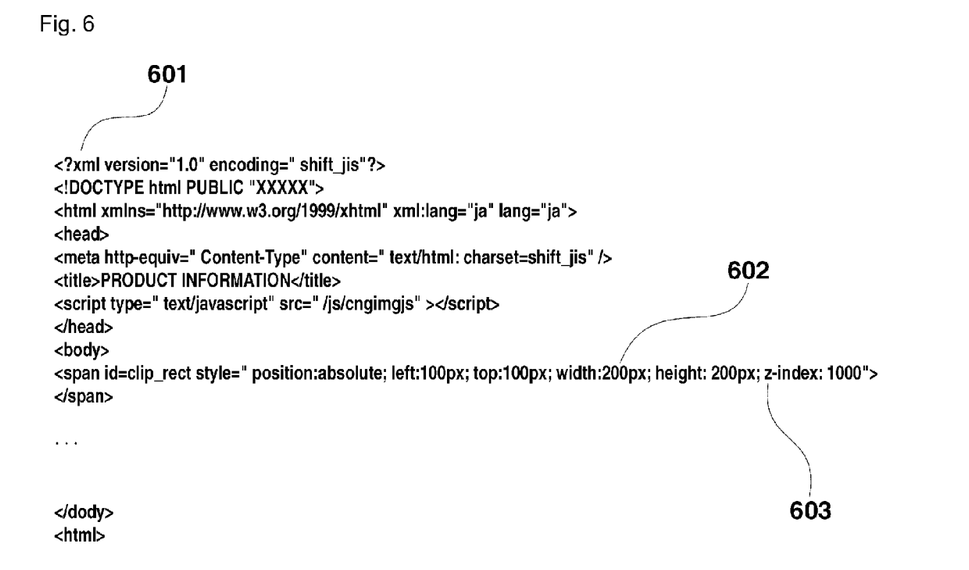
FIG. 6 illustrates an example of a structured document.

FIG. 6 illustrates an example of a structured document. The structured document 601 in FIG. 6 is written in XHTML. The structured document 601 has a CSS file (not illustrated) that describes layout of the elements in the document.

The structured document 601 contains a <span> tag 602 to display the region selection object 502. In the <span> tag 602 in FIG. 6, a "position: absolute" attribute is used to specify the position of the region selection object 502 in the absolute coordinates on a web page so that the region selection object 502 can be displayed at any coordinates. The absolute coordinates, which are different from the coordinates of a screen or the coordinates of a window of a browser, are not affected even when the window is shifted, enlarged, or reduced. The <span> tag 602 in FIG. 6 specifies the position of the region selection object 502 at left: 100 px and right: 100 px with a width of 200 px and a height of 200 px, wherein px represents the number of pixels.

A z-index attribute 603 in FIG. 6 specifies a display order of the region selection object 502 in the display, and the "z-index:1000" is a description for the forefront display. Under the condition, if the elements other than the region selection object 502 in the structured document each have a z-index of less than 1000, the region selection object 502 is raised to the forefront of the screen. The <span> tag for the region selection object 502 has a unique ID in the structured document so that the ID can be used to obtain an object when the size of the region selection object 502 is changed.

Not illustrated in FIG. 6, but with respect to the region selection object 502, a color and a background of the rectangular region 503, and a filter attribute to make the rectangular region 503 transparent are specified. Not illustrated in FIG. 6, but with respect to the region selection object 502, in addition to the tags for the rectangular region 503, tags for the objects 504 to 511 for changing a rectangular size are written in the document, which are not described here.

FIGS. 4 and 5 illustrate a GUI screen generated by the browser 301 as an image displayed by the PC 101, but when an application other than the browser 301 is also activated, a window for the application may be contained in the displayed image. Furthermore, after the region selection object 502 is displayed as illustrated in FIG. 5, a window of the browser 301 can be shifted, enlarged, or reduced on the screen.

Even when the position or size of the rectangular object 503 on the screen is changed, the rectangular object 502 corresponds to the absolute coordinates of a selected region in the web page, and thereby there is no change in the region in the web page to be printed out.

Figure 7:
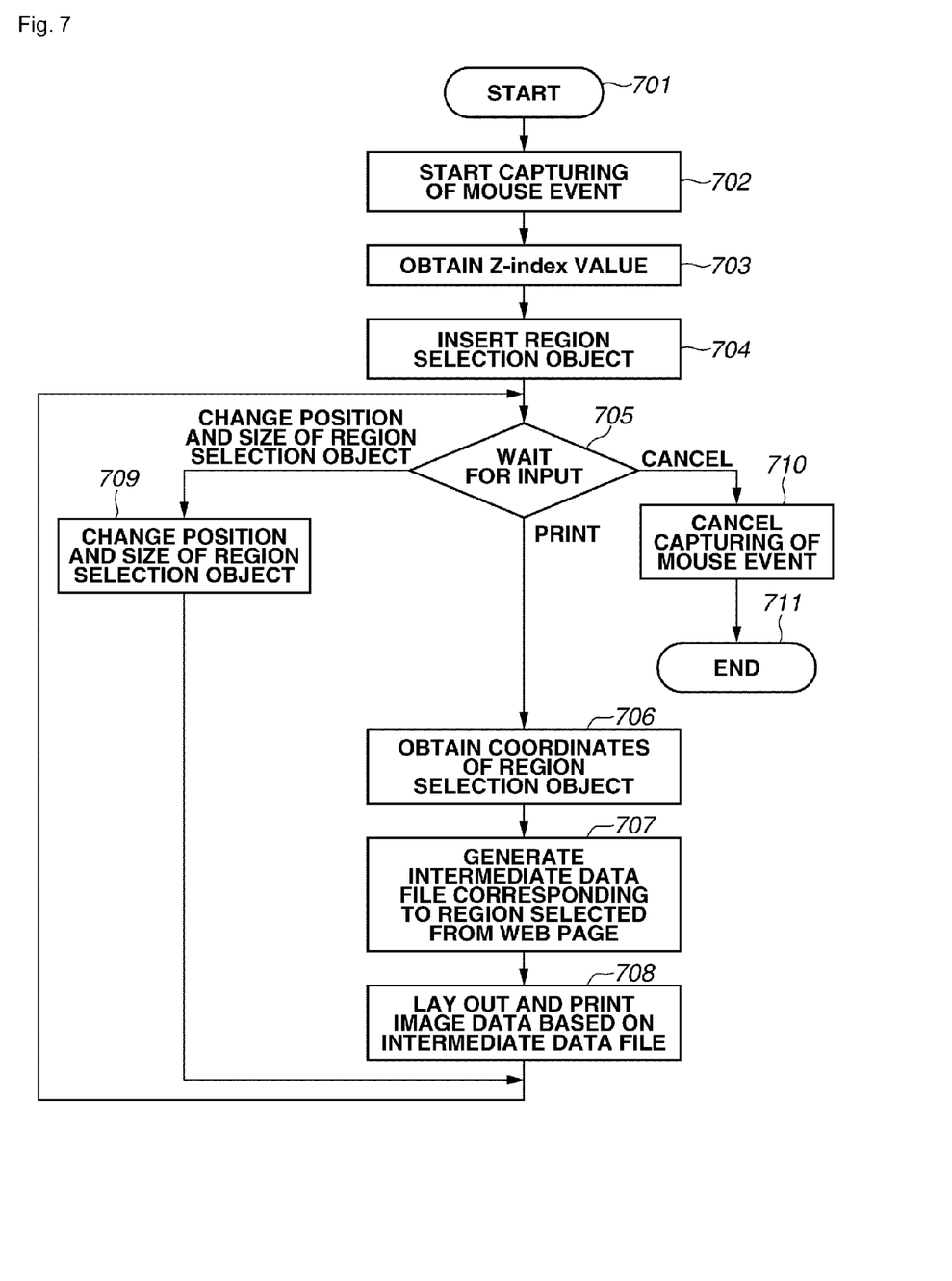
FIG. 7 is a flowchart illustrating a procedure performed by a structured-document printing module.

FIG. 7 is a flowchart illustrating a process in the structured-document printing module 302. Programs to execute the process are stored in the ROM 203 and the hard disk 204. When the CPU 201 reads and loads the programs into the RAM 202 and executes them, the process below is performed.

In step 701, the region selection button 406 of the browser 301 is clicked, which activates the structured-document printing module 302 to start the process. In step 702, the structured-document printing module 302 starts to capture a mouse event occurring within a region that is displayed based on a structured document in the displayed browser 301. A captured mouse event is processed in the region-selection-object change unit 304, based on information input through a mouse connected to the PC 101. In step 703, the region-selection-object insertion unit 303 obtains a z-index attribute value of each element in the structured document, and specifies a z-index attribute value of the object that is raised to the forefront of the screen.

In step 704, the region-selection-object insertion unit 303 sets initial coordinates, an initial size, and a z-index attribute value for a forefront display of a selected region represented by the region selection object 502, and inserts these descriptions in the <body> element of the structured document. To raise the display of the region selection object 502 to the forefront of the screen, the region selection object 502 is set to have a z-index attribute value larger than the other elements obtained in step 703.

In step 705, the structured-document printing module 302 waits for an instruction based on information from the mouse. When an instruction to select the cancel button 513 is input through a mouse operation, then in step 710, the structured-document printing module 302 cancels the capture. Then, in step 711, the structured-document printing module 302 ends the region selection process. In step 705, when an instruction to change the position and size of the region selection object 502 is input, the process proceeds to step 709. In step 709, the structured-document printing module 302 changes the position and size of the region selection object 502 in the structured document in response to the instruction input through a mouse operation. Then, the process returns to step 705.

In step 705, when an instruction to select the print button 512 is input, the structured-document printing module 302 executes printing operations in steps 706 to 708, and the process returns to step 705 to wait for input of an instruction. In step 706, the selected-region-data extraction unit 305 obtains the coordinates of the selected region represented by the region selection object 502 inserted in the structured document, within the entire web page based on the structured document. In step 707, the selected-region-data extraction unit 305 extracts elements and clip information within the region that overlaps the region selection object 502 at the coordinates obtained in step 706 within the web page based on the structured document, and generates an intermediate data file. The clip information indicates the position where a web page is partly clipped out when the region is extracted from the web page as described above. According to the clip information, image data is generated by clipping out a region corresponding to the selected region from the image data that is generated based on the generated intermediate data file. The region selection object 502 extracted in step 707 has the initial size or a size that is changed in step 709 as described above. After the operation in step 707, the structured-document printing module 302 determines the region in the web page that corresponds to the region selection object 502 at the coordinates obtained in step 706, as a region to be printed. In step 708, the print layout unit 306 lays out the image data for printing, based on the intermediate data file and according to the paper size indicated by print settings. Based on the image data laid out by the print layout unit 306, the print processing unit 308 performs a printing operation.

In step 706, an intermediate data file only for a selected region may be generated. In this case, the generated intermediate data file can be used as it is to obtain image data corresponding to a selected region.

In step 708, the print preview unit 307 may display a print preview on the display device, based on the image data laid out by the print layout unit 306.

Through the operations described above, the structured-document printing module 302 can select a region from a web page displayed by the browser in response to a mouse operation by a user, and extracts and prints out the selected region. As a result, a user can specify a desired region in a web page for printing. A selected region can be changed through a mouse operation, and thereby any region can be selected even when the size of a web page is so large that a scroll of the screen is required to select the region.

In the above description, a selected region is displayed by inserting an object for selecting a region in a structured document. This enables a package with a scripting language that is independent of a platform such as Java (registered trademark) Script, and facilitates the execution of the process using software for scripting languages such as a web application. In the present exemplary embodiment, a region of a web page based on a structured document is selected using plug-in software from a browser, but the selection may be made using single application software.

Figure 8:
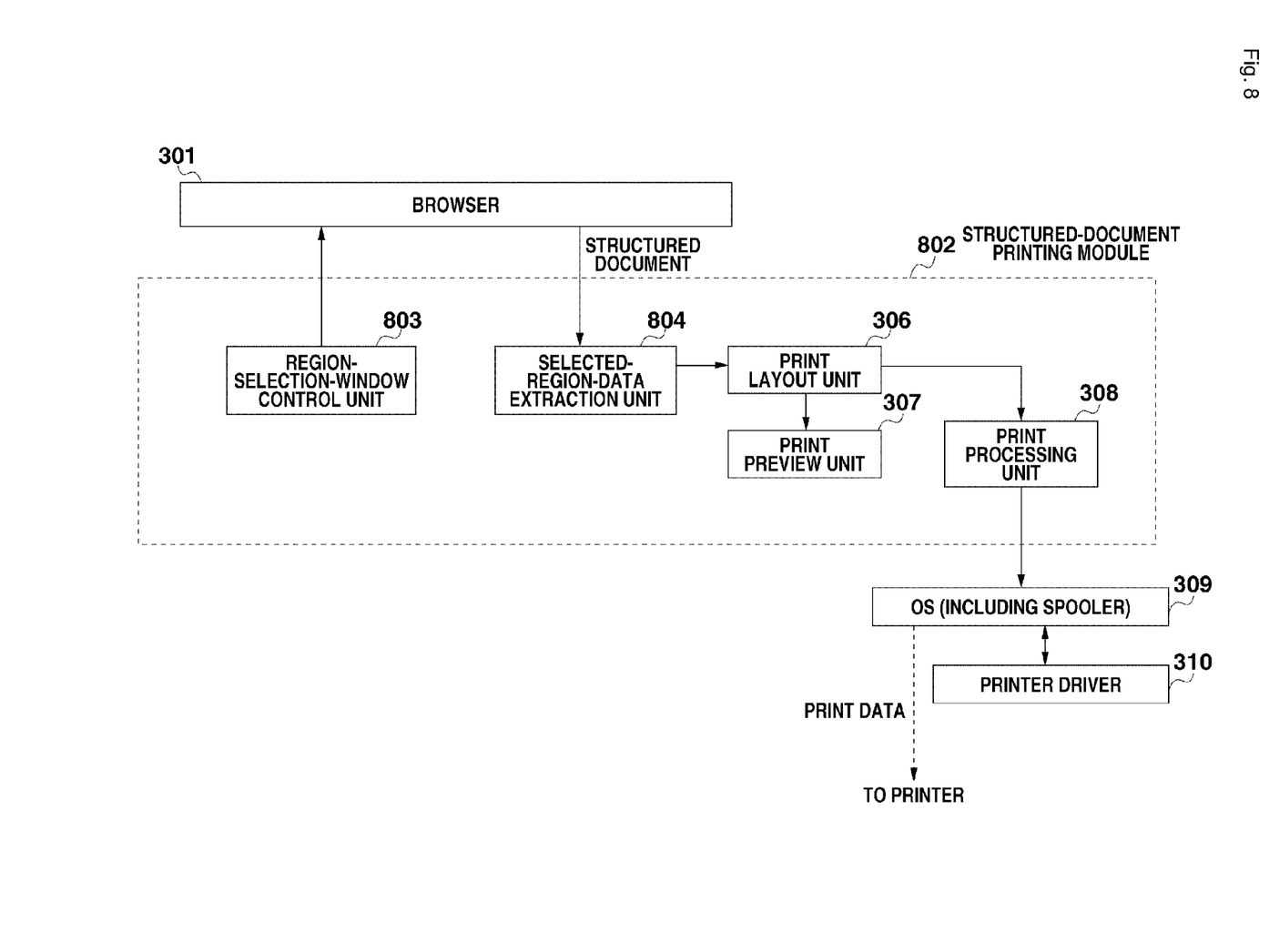
FIG. 8 is a block diagram illustrating a software configuration in a PC.

Another approach for a user to specify a region to be printed will be described. FIG. 8 is a block diagram illustrating a software configuration in the PC 101. A program running on the PC 101 and its data processing will be described with reference to FIG. 8.

The browser 301 in FIG. 8 is similar to that in FIG. 3, which will not be described below in detail. In FIG. 8, a structured-document printing module 802 is plug-in software from the browser 301, and is executed when a user inputs an instruction for a region selection to the browser 301.

In the structured-document printing module 802, a region-selection-window control unit 803 displays a region selection window for selecting a region in a structured document, at the forefront of the browser.

Figure 9:
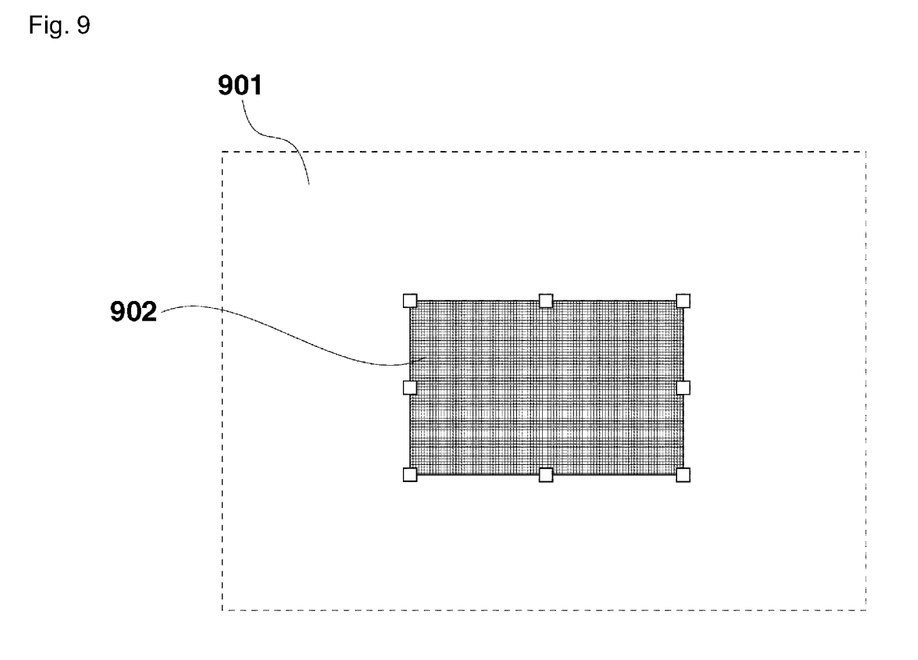
FIG. 9 illustrates a region selection window.

FIG. 9 illustrates a region selection window 901. The region selection window 901 includes a transparent region and a semi-transparent rectangular region 902. The region selection window 901 including transparent and semi-transparent regions is displayed at the forefront of a region where a web page of the browser 301 is displayed, which enables the overlying of a selected region on a structured document.

The region-selection-window control unit 803 changes coordinates of a selected rectangular region 902 in response to an input of an instruction to change a selected region through the input device 207 such as a mouse from a user. Accordingly, a user can specify any rectangular region in a displayed web page as a selected region using an input device such as a mouser.

When a user selects a region in a web page and inputs an instruction to the browser to start to print the region or to display a print preview of the region, the selected-region-data extraction unit 804 is executed. The selected-region-data extraction unit 804 obtains coordinates of the rectangular region 902 set by the region-selection-window control unit 803. The coordinates may be absolute coordinates in the entire web page or have an absolute size, or have coordinates or a size in a region in the web page within a window of the browser 301. In the case of coordinates in a region of a web page in a window, the coordinates and size of the region selected by a user in the web page of the browser 301 can be obtained by referring to the coordinates. Then, the coordinates and the size in the displayed web page are converted into those of the entire web page, resulting in the coordinates and the size of the region selected by a user from the entire web page.

After obtaining the coordinates of the rectangular region 902, the selected-region-data extraction unit 804 extracts elements that correspond to the region defined by the obtained coordinates and size in the web page displayed by the browser 301, from the elements in the structured document. The extracted elements are generated as an intermediate data file as described above.

The print layout unit 306, the print preview unit 307, the print processing unit 308, the OS 309, and the printer driver 310 in FIG. 8 each operate as those in FIG. 3, which will not be described in detail.

As described above, the data processing in FIG. 8 displays a region selection window having transparent and semi-transparent regions at the forefront of the browser to enable a selection of any region in a web page based on a structured document.

The coordinates and size of the rectangular region 902 may be obtained at any point of time between the display of a region selection window by the region-selection-window control unit 803 and the extraction of data by the selected-region-data extraction unit 804. For example, the coordinates and size may be obtained when a window of a browser is shifted, the size of the window is changed, or the print button 512 is clicked.

In the present exemplary embodiment, a region selection window having transparent and semi-transparent regions is provided separately from a browser to display a selected region. In this case, the position and size of a region selection window are changed according to the shift and size of a window of a browser, which requires monitoring of the browser information.

The following is an approach to select a region without monitoring of browser information.

Figure 10:
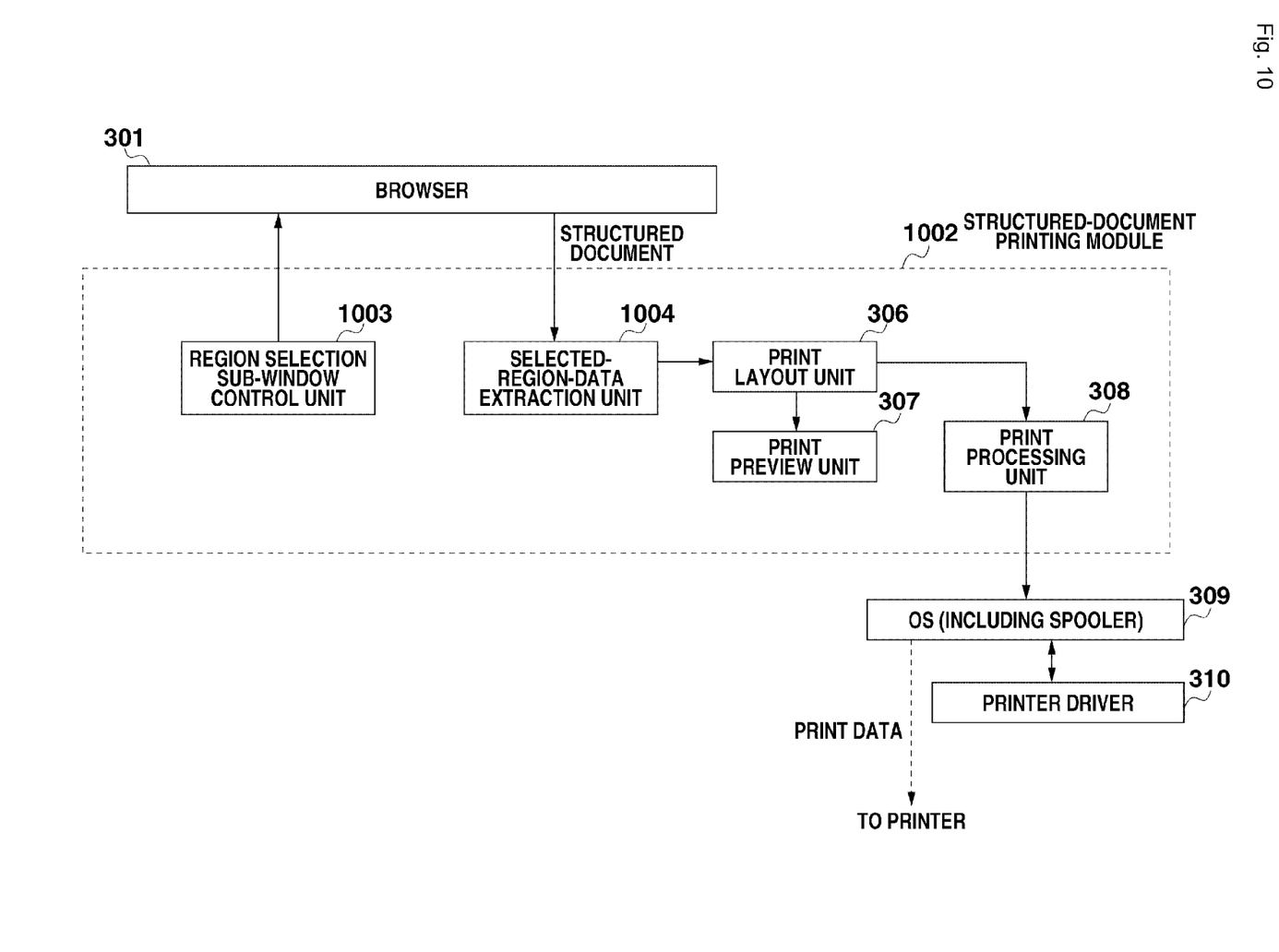
FIG. 10 is a block diagram illustrating a software configuration in a PC.

FIG. 10 is a block diagram illustrating a software configuration in the PC 101. A program running on the PC 101 and its data processing will be described with reference to FIG. 10.

The browser 301 in FIG. 10 is similar to that in FIG. 3, which will not be described below in detail. In FIG. 10, a structured-document printing module 1002 is plug-in software from the browser 301, and is executed when a user inputs an instruction for a region selection to the browser 301.

In the structured-document printing module 1002, a region selection sub-window control unit 1003 generates a region selection window that allows a user to select a region in a web page as a sub-window of a browser. The sub-window is arranged on a window of a browser at a fixed position relative to the browser.

Figure 11:
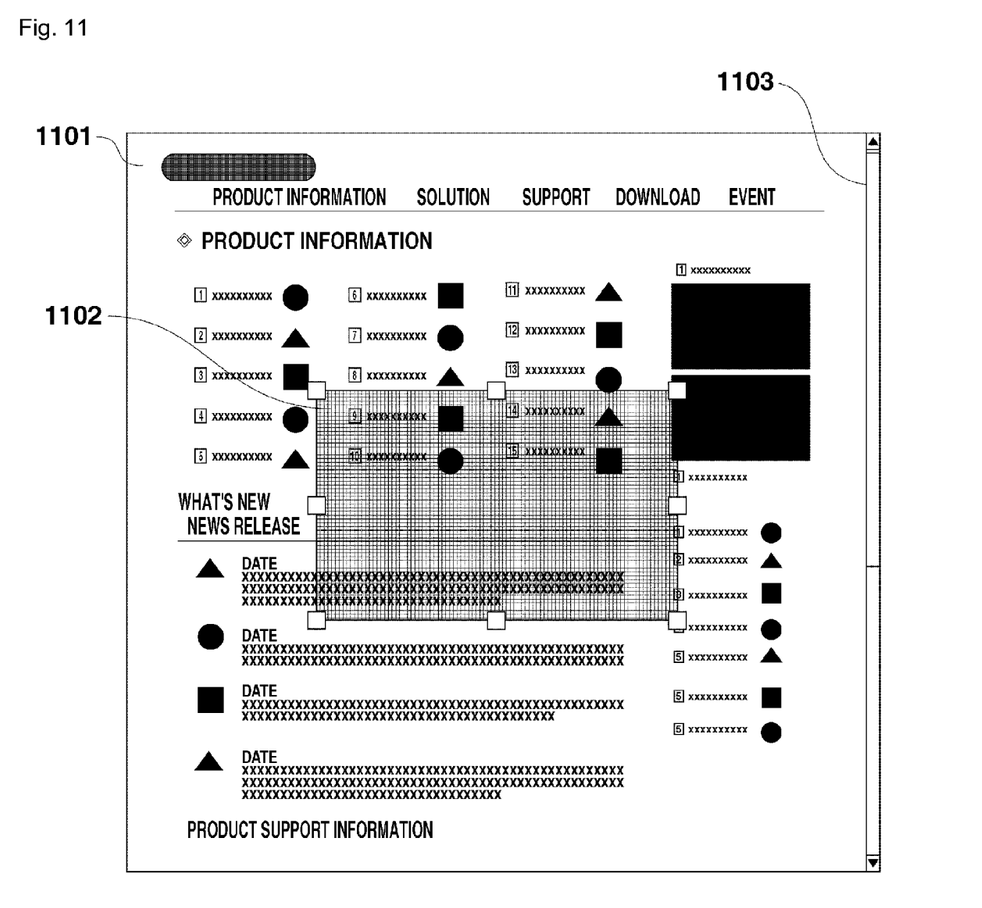
FIG. 11 illustrates a GUI screen with a region selection window.

FIG. 11 illustrates a GUI screen of a region selection window. The region selection sub-window control unit 1003 generates a region selection window 1101 as a sub-window of a browser, and arranges the sub-window on the browser, the sub-window having the same size as that of a web page in a window of a browser and lying in the same region as that of the web page.

As illustrated in FIG. 11, a web page is generated in the region selection window 1101, based on a structured document obtained from the browser. The region selection window 1101 may be provided with a scroll bar 1103 if needed, so that the entire region of the web page can be displayed by scrolling the scroll bar 1103.

The region selection window 1101 is further provided with a rectangular selection region 1102 that is a semi-transparent rectangle. The region selection sub-window control unit 1003 inputs an instruction to change coordinates and a size of the semi-transparent rectangle, when a user operates the input device 207 such as a mouse. In response to the input, the coordinates and size of the rectangular selection region 1102 are changed to generate the rectangular selection region 1102 again. Accordingly, a user can specify any rectangular region in a web page using a structured document through the input device 207 such as a mouse, as a selected region.

After a user selects a region in a web page as described above, when the user inputs an instruction to start to print the region or to display a print preview of the region, a selected-region-data extraction unit 1004 is executed. The selected-region-data extraction unit 1004 obtains coordinates of a rectangular selection region that is set by the region selection sub-window control unit 1003. Then, the selected-region-data extraction unit 1004 extracts a region at the coordinates of the rectangular selection region from the displayed web page, which is generated into an intermediate data file.

The print layout unit 306, the print preview unit 307, the print processing unit 308, the OS 309, and the printer driver 310 in FIG. 11 each operate as those in FIG. 3, which will not be described in detail.

As described above, the region selection window 1101 is provided as a sub-window of a browser, which allows a user to select any region in a web page. Particularly in the present exemplary embodiment, no monitoring of browser information is required to accommodate the region to a shift or change in size of a browser.

In the present exemplary embodiment, the focus is primarily put on the case where the data of a region a user selects from a web page is extracted and generated into an intermediate data file. The data of a region a user selects from a web page, however, may be extracted as bit map data. To extract such a region as bit map data, bit map data stored in an image memory for display on a display device may be used. In this case, however, a user may accidentally select a region that is not within a web page, from images to be displayed on the screen.

In contrast, in the present exemplary embodiment, image data is extracted based on absolute coordinates of a web page or coordinates of a web page displayed in a browser. This limits the region selected by a user for printing or print preview to the region where a web page is displayed.

In the present exemplary embodiment, a region-selection image which is used to specify a region in a web page for output by a user is overlapped on the web page based on a structured document. The overlapping, however, is not the only approach as long as a user specifies a region in a web page and the coordinates of the region in the web page can be obtained. For example, in response to dragging by a user in a region where a web page is displayed, coordinates of a region in a web page that is specified by the dragging may be obtained.

Furthermore, in the present exemplary embodiment, a region for printing and print preview is determined based on coordinates and size of the region in a web page. Thus, even if the target region is not displayed when printing of the region is performed, the output can be achieved according to the coordinates of the region in the web page. For example, even when a region is scrolled out after the region is determined to be printed or displayed for print preview, the image of the region can be output.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-138399 filed Jun. 9, 2009, which is hereby incorporated by reference herein in its entirety.

The invention claimed is:

1. An apparatus comprising:
   an insertion unit configured to insert a region selection object into a structured document corresponding to a web page, wherein the region selection object corresponds to a region selection image for selecting a region on the web page, and the region selection image is superposed on the web page based on the structured document into which the region selection object has been inserted by the insertion unit;
   a determination unit configured to determine the region selected by the region selection image in the web page, according to an instruction from a user; and
   an output unit configured to cause an outputting apparatus to output an image corresponding to the region determined by the determination unit, in accordance with a size of an output area for outputting the image.

2. The apparatus according to claim 1, wherein the region selection object has coordinates in the web page, the coordinates corresponding to the region selected by the region selection image in the web page, and
   wherein the determination unit determines the region in the web page based on the coordinates of the region selection object.

3. The apparatus according to claim 1, wherein the output unit causes a printer to print the image, or outputs the image to a display to display the image.

4. The apparatus according to claim 1, wherein a size of the output area is a size of a printing area based on a size of a printing medium for printing the image.

5. The apparatus according to claim 1, further comprising a changing unit configured to change at least one of a size and a position of the region indicated by the region selection image, in the web page;
wherein the determination unit determines the region of which at least one of the size and the position in the web page is changed by the changing unit.

6. The apparatus according to claim 1, wherein the structured document has a plurality of elements, and the output unit causes the outputting apparatus to output a first image corresponding to a part of an element which includes vector data, by extracting the element of which the part is included in the region having been determined by the determination unit, by generating a second image of the element, and by clipping the first image corresponding to the part from the generated second image.

7. The apparatus according to claim 6, wherein the element of a vector data is a text element of text data or a graphic element of graphic data.

8. The apparatus according to claim 6, wherein the output unit extracts at least one element which at least a part corresponds to the region.

9. The apparatus according to claim 6, wherein the output unit causes the outputting apparatus to output the first image of the part of the element, by generating intermediate data corresponding to the element and by clipping the first image from the second image drawn based on the generated intermediate data.

10. The apparatus according to claim 6, wherein the output unit extracts the element and acquires information for specifying the part of the element, and clips the first image in accordance with the information.

11. A method comprising:
inserting a region selection object into a structured document corresponding to a web page, wherein the region selection object corresponds to a region selection image for selecting a region on the web page, and the region selection image is superposed on the web page based on the structured document into which the region selection object has been inserted;
determining the region selected by the region selection image in the web page, according to an instruction from a user; and
causing an outputting apparatus to output an image corresponding to the region determined, in accordance with a size of an output area for outputting the image.

12. A non-transitory computer-readable storage medium storing a program for causing a computer to perform a method, the method comprising:
inserting a region selection object into a structured document corresponding to a web page, wherein the region selection object corresponds to a region selection image for selecting a region on the web page, and the region selection image is superposed on the web page based on the structured document into which the region selection object has been inserted;
determining the region selected by the region selection image in the web page, according to an instruction from a user; and
causing an outputting apparatus to output an image corresponding to the region determined, in accordance with a size of an output area for outputting the image.

13. The recording medium according to claim 12, wherein the program is a plug-in program for a web browser which causes a display to display the web page.

* * * * *